US009194466B2

(12) United States Patent
Miller et al.

(10) Patent No.: US 9,194,466 B2
(45) Date of Patent: Nov. 24, 2015

(54) STEERING CABLE CORE SUPPORT SLEEVE FOR A MECHANICAL STEERING ACTUATOR

(71) Applicant: Marine Acquisition (US) Incorporated, Limerick, PA (US)

(72) Inventors: Matthew D. Miller, Blandon, PA (US); Jason Richards, Pottstown, PA (US)

(73) Assignee: Marine Acquisition (US) Incorporated, Limerick, PA (US)

( * ) Notice: Subject to any disclaimer, the term of this patent is extended or adjusted under 35 U.S.C. 154(b) by 0 days.

(21) Appl. No.: 14/369,952

(22) PCT Filed: Dec. 31, 2012

(86) PCT No.: PCT/US2012/072266
§ 371 (c)(1),
(2) Date: Jun. 30, 2014

(87) PCT Pub. No.: WO2013/102188
PCT Pub. Date: Jul. 4, 2013

(65) Prior Publication Data
US 2014/0338476 A1 Nov. 20, 2014

Related U.S. Application Data

(60) Provisional application No. 61/581,899, filed on Dec. 30, 2011.

(51) Int. Cl.
| | |
|---|---|
| *F16H 19/06* | (2006.01) |
| *B63H 25/52* | (2006.01) |
| *B63H 25/10* | (2006.01) |
| *F16C 1/18* | (2006.01) |
| *F16C 1/26* | (2006.01) |

(52) U.S. Cl.
CPC ............ *F16H 19/0622* (2013.01); *B63H 25/10* (2013.01); *B63H 25/52* (2013.01); *F16C 1/18* (2013.01); *F16C 1/262* (2013.01); *Y10T 74/18832* (2015.01)

(58) Field of Classification Search
CPC .......................... F16H 19/0622; B63H 25/52
USPC .............................. 74/89.2, 496, 502.4, 502.6
See application file for complete search history.

(56) References Cited

U.S. PATENT DOCUMENTS

| | | | |
|---|---|---|---|
| 2,740,306 | A | 4/1956 | Shimanckas |
| 2,767,596 | A | 10/1956 | Simon et al. |
| 2,890,595 | A | 6/1959 | Loeffler |
| 3,110,193 | A | 11/1963 | Bratz |
| 3,258,989 | A | 7/1966 | Frese et al. |
| 3,349,637 | A | 10/1967 | Moore |

(Continued)

FOREIGN PATENT DOCUMENTS

| | | | |
|---|---|---|---|
| DE | 3826474 A1 | 2/1990 | |
| FR | 625181 | * 8/1927 | ................ F16C 1/10 |

*Primary Examiner* — Vinh Luong
(74) *Attorney, Agent, or Firm* — Berenato & White, LLC

(57) ABSTRACT

A steering actuator comprises a housing having a steering cable entry port. A drive mechanism is rotatably mounted within the housing. A steering cable extends through the steering cable entry port and is actuated by the drive mechanism. A steering cable core support sleeve is disposed within the housing between the steering cable entry port and an interface between the steering cable and the drive mechanism. A cable core of the steering cable extends through the steering cable support sleeve.

9 Claims, 7 Drawing Sheets

(56) References Cited

U.S. PATENT DOCUMENTS

| | | |
|---|---|---|
| 3,766,801 A | 10/1973 | Wiegand |
| 3,838,607 A | 10/1974 | Hemens |
| 3,922,995 A | 12/1975 | Kroll et al. |
| 3,954,022 A | 5/1976 | Hemens |
| 4,014,281 A | 3/1977 | Hemens |
| 4,292,859 A | 10/1981 | Teraura |
| 4,961,392 A | 10/1990 | Ballard |
| 5,104,156 A | 4/1992 | Carlson |
| 5,105,924 A | 4/1992 | Carlson |
| 5,253,543 A | 10/1993 | Carlson |
| 5,271,543 A * | 12/1993 | Grant et al. ................ 227/179.1 |
| 8,535,327 B2 * | 9/2013 | Schaller et al. ................ 606/99 |

* cited by examiner

STEERING CABLE CORE SUPPORT SLEEVE FOR A MECHANICAL STEERING ACTUATOR

CROSS-REFERENCE TO RELATED APPLICATION

This application is a national stage application of International Application No. PCT/US2012/072266 filed Dec. 31, 2012, which claims the benefit under 35 U.S.C. 119(e) of U.S. Provisional Application Ser. No. 61/581,899 filed Dec. 30, 2011 by Miller et al., which is hereby incorporated herein by reference in its entirety and to which priority is claimed.

BACKGROUND OF THE INVENTION

1. Field of the Invention

The present invention relates to a mechanical steering actuator and, in particular, to a steering cable core support sleeve for the mechanical steering actuator.

2. Description of the Related Art

U.S. Pat. No. 3,766,801 issued on Oct. 23, 1973 to Wiegand, and the full disclosure of which is incorporated herein by reference, discloses an actuator assembly of the type for longitudinally moving a flexible motion transmitting core element to transmit motion in a curved path. The assembly includes a housing comprising a base and a cover which are snapped together. The base and cover are made of plastic. An annular axle portion is integral with the base and extends toward the cover and rotatably supports a circular drive means which includes an internal gear and a peripheral groove for receiving the core element. A shaft is rotatably supported by the housing and supports a pinion which engages the internal gear.

SUMMARY OF THE INVENTION

It is an object of the present invention to provide a steering cable core support sleeve for an improved mechanical steering actuator.

There is accordingly provided a steering cable core support sleeve for supporting a steering cable core within a steering actuator. The steering cable core support sleeve comprises at least one lateral opening for receiving a protrusion to provide axial and rotational alignment of the steering cable support sleeve within steering actuator. The steering cable core support sleeve may have a notch at a first end thereof and/or a flange at a second end thereof. The notch may be oblique cut in the first end of the steering cable core support sleeve.

There is also provided a mechanical steering actuator comprising a housing having a steering cable entry port. A drive mechanism is mounted within the housing. A steering cable having a cable core extends through the steering cable entry port and is actuated by the drive mechanism. A steering cable core support sleeve is disposed within the housing between the steering cable entry port and an interface between the cable core of the steering cable and the drive mechanism. The cable core of the steering cable extends through the steering cable core support sleeve.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
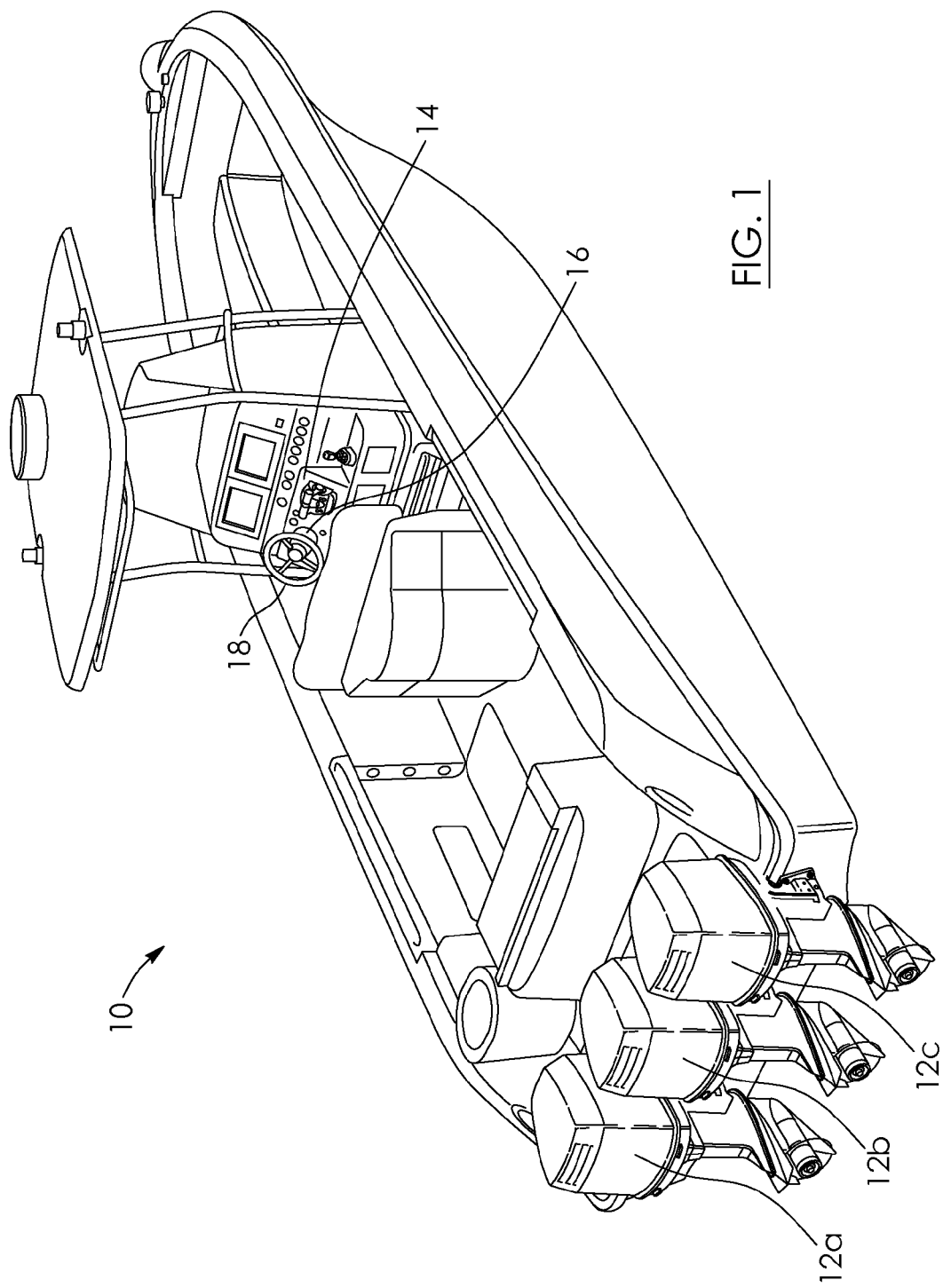
FIG. 1 is perspective view of a marine vessel provided with an unproved mechanical steering actuator.
Figure 2:
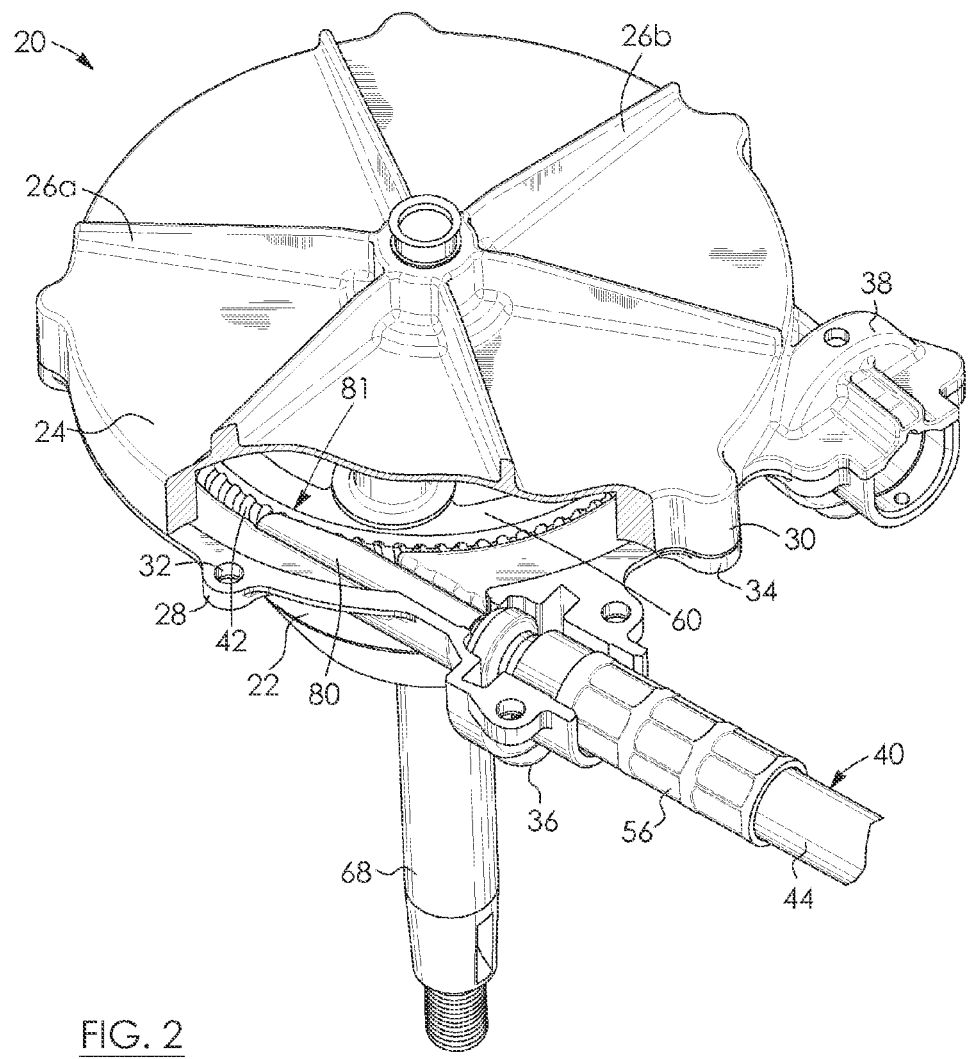
FIG. 2 is a perspective, partially broken-away, view of an improved mechanical steering actuator.

Referring to the drawings and first to FIG. 1, there is shown a marine vessel 10 which is provided with a plurality of propulsion units in the form of outboard motors 12a, 12b and 12c. The marine vessel 10 is also provided with a control head 14 which supports a helm 16 on which a steering wheel 18 is mounted. The helm 16 and steering wheel 18 may be used by an operator to impart steering motion to the outboard motors 12a, 12b and 12c. The helm 16 is provided with an improved mechanical steering actuator 20 which is shown in FIG. 2. The steering actuator 20 has a housing 22 and a cover 24. The housing 22 and cover 24 may each be formed from plastic or another low strength material such as zinc or aluminum. The cover 24 may be provided with strengthening ribs, for example, strengthening ribs 26a and 26b. The housing 22 and cover 24 are provided with means to allow for interlocking engagement with one another. In this example, the means to allow for interlocking engagement of the housing 22 and cover 24 includes a plurality of circumferentially spaced-apart flanges, for example flange 28, extending from the housing 22 and plurality of circumferentially spaced-apart bosses, for example boss 30, extending from the cover 24. Each of the flanges is provided with an opening 32 as shown for exemplar flange 28 and each of the bosses is provided with a pin 34 as shown for exemplar boss 30. Engagement of corresponding pins and openings allows for interlocking engagement of the housing 22 and cover 24.

Figure 3:
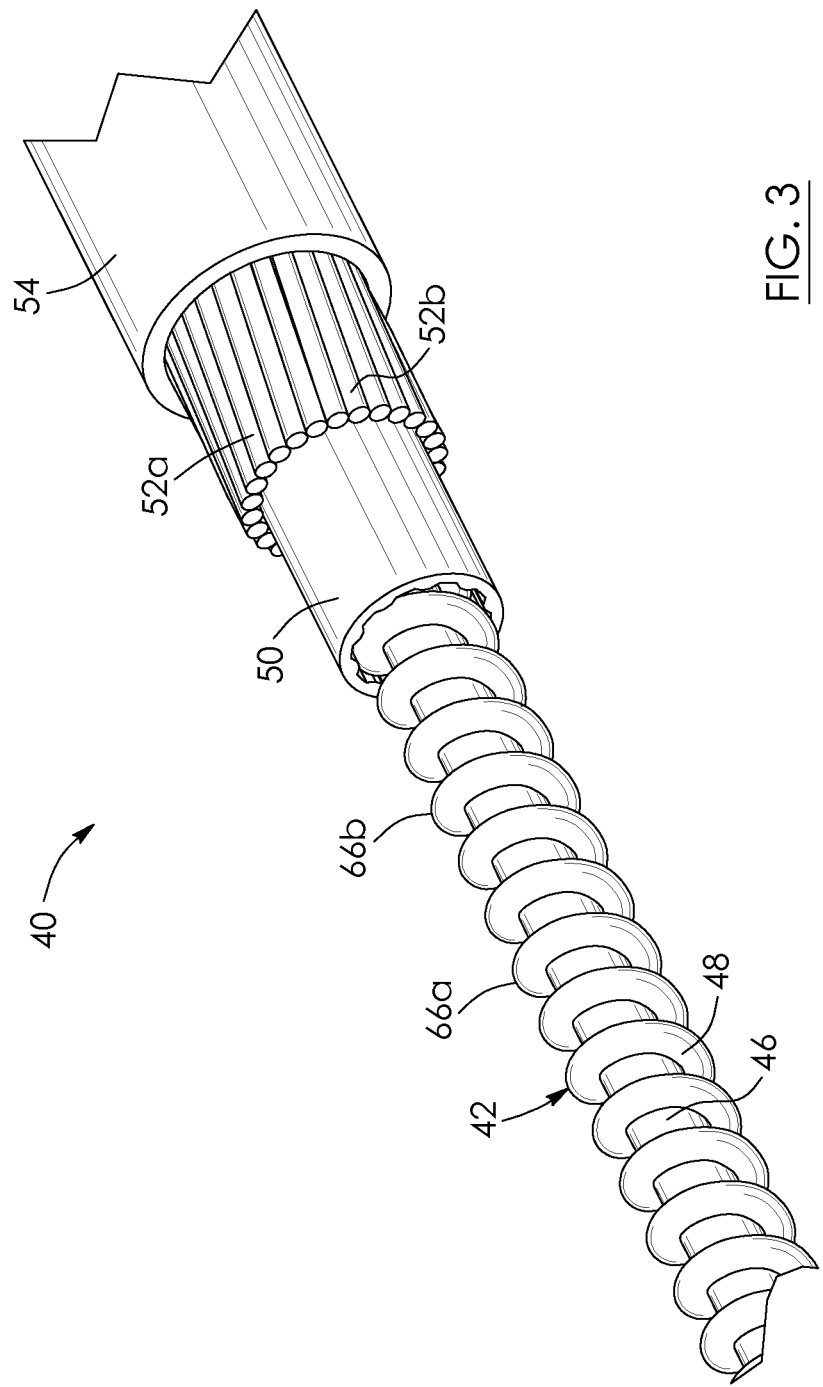
FIG. 3 is a fragmentary perspective view of a steering cable of the steering actuator of FIG. 2.

The steering actuator 20 also has a pair of steering cable entry ports 36 and 38 through which a steering cable 40 extends into the housing 22. FIG. 2 shows the steering cable 40 extending through only one of the cable entry ports 36 but it will be understood by a person skilled in the art that the steering cable 40 will extend through both of the cable entry ports 36 and 38 when the steering actuator 20 is operatively coupled to a helm of a marine vessel. The steering cable 40 includes a cable core 42 slidably received within a cable conduit 44 as best shown in FIG. 3. The cable core 42 includes a central mandrel wire 46 and an outer helical wire 48 wound about the central mandrel wire. The cable conduit 44 includes a cable core liner 50 which, in this example, is a plastic liner formed from high density polyethylene although other materials could be used. A plurality of adjacent lay wires, for example lay wires 52a and 52b, extend generally longitudinally along the cable core liner 50 and provide resistance to axial compression loads. A plastic coating 54 covers the lay wires 52a and 52b in this example.

Figure 4:
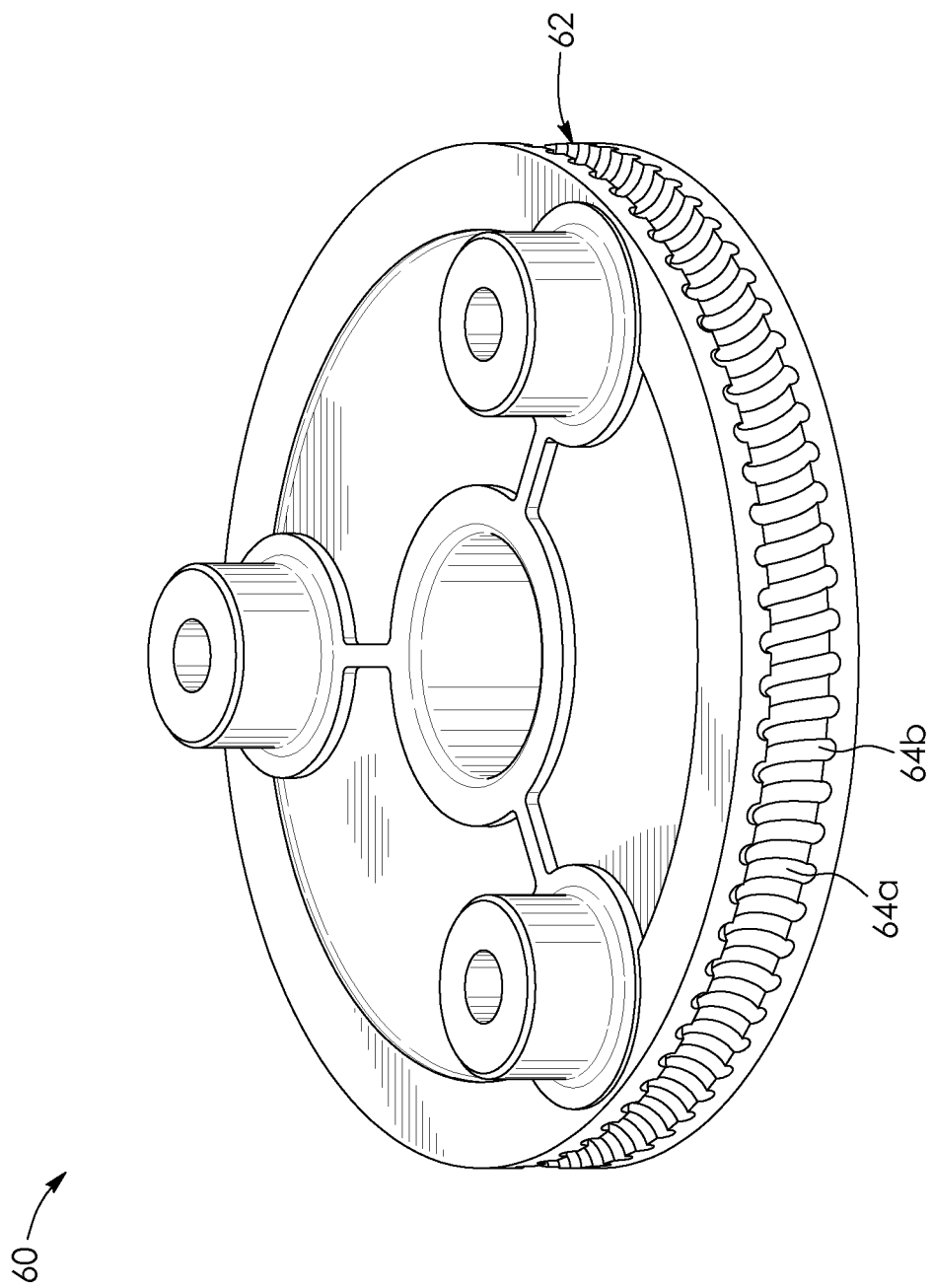
FIG. 4 is a perspective view of a pulley wheel of the steering actuator of FIG. 2.

Referring back to FIG. 2, the steering cable 40 is also provided with fittings, for example fitting 56, which engage corresponding ones of cable entry ports 36 and 38 to couple the steering cable 40 to the housing 22. The cable conduit 44 terminates within the fitting 56 while the cable core 42 extends through the fitting 56 into the housing 22. Within the housing 22 the cable core 42 is wound about a pulley wheel 60 which is rotatably mounted within the housing 22 and shown in greater detail in FIG. 4. The pulley wheel 60 has a circumferential groove 62 extending peripherally thereabout for receiving the steering cable 40. The circumferential groove 62 is further provided with a plurality of spaced-apart recesses, for example recesses 64a and 64b, for receiving helical projections, for example helical projections 66a and 66b formed by the outer helical wire 48, of the cable core 42 which are shown in FIG. 3. This engagement of the pulley wheel 60 and steering cable 40 allows the pulley wheel to actuate or impart motion to the steering cable. In other embodiments the pulley wheel may be replaced by a sprocket wheel with the sprockets engaging gaps between the helical projections of the cable core.

The pulley wheel 60 is part of a drive mechanism which further includes a drive shaft 68 which is shown in FIG. 2. The drive mechanism may also include a plurality of planetary gears (not shown). The drive shaft 68 imparts rotary motion to the pulley wheel 60. In turn the pulley wheel 60 imparts motion to the steering cable 40 which transmits a push/pull force to a marine propulsion unit or other steered element such as a rudder. To prevent the cable core 42 from buckling during the transmission of the push/pull force the steering actuator 20 is provided with a tubular steering cable core support sleeve 80 disposed between the cable entry port 36 and an interface 81 between the cable core 42 and the pulley wheel 60. The support sleeve 80 may be formed from a deformation resistant hard material such as 21-Gauge steel to protect the housing 22 from wear between the cable entry port 36 and the interface 81 between the cable core 42 and the pulley wheel 60.

Figure 5:
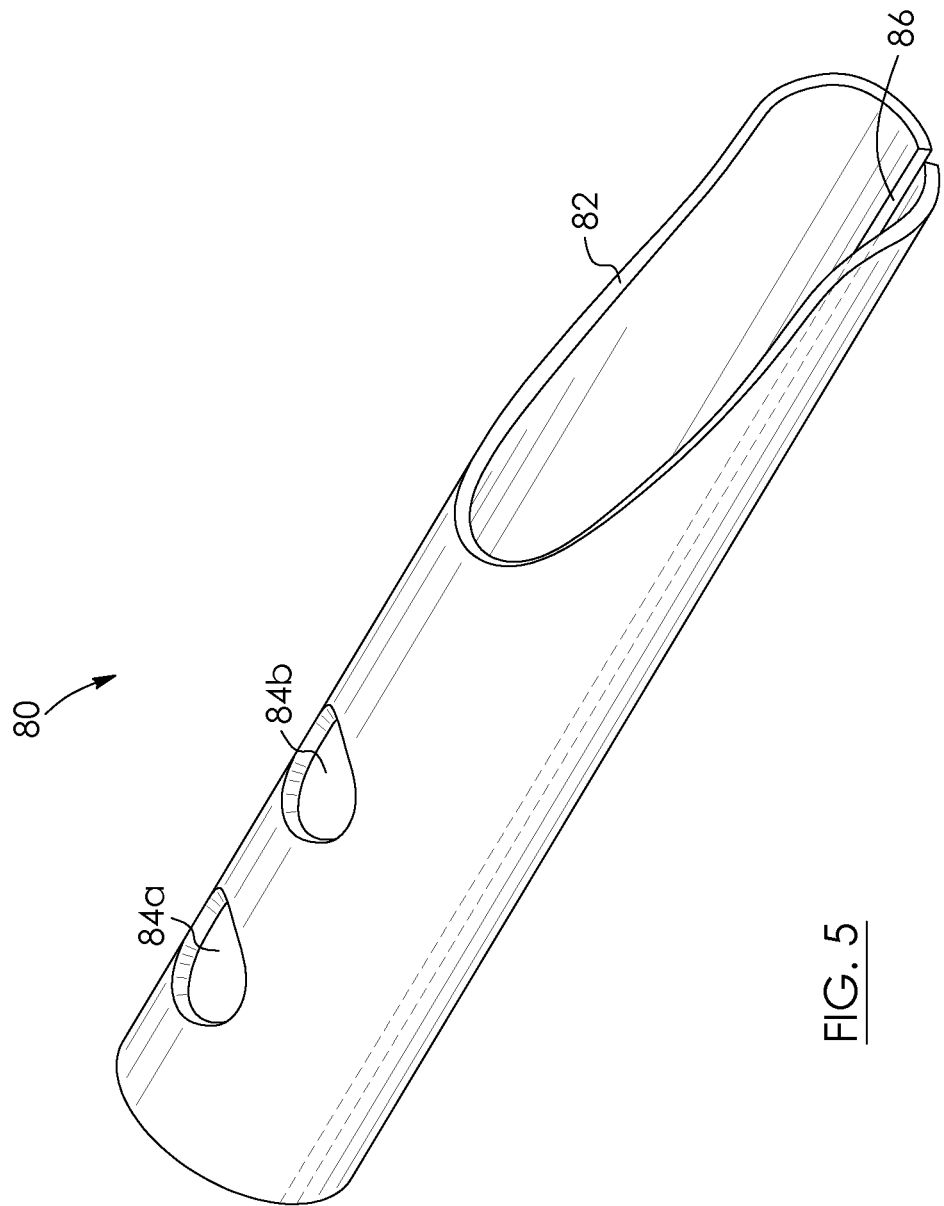
FIG. 5 is a perspective view of a steering cable core support sleeve of the steering actuator of FIG. 2.
Figure 6:
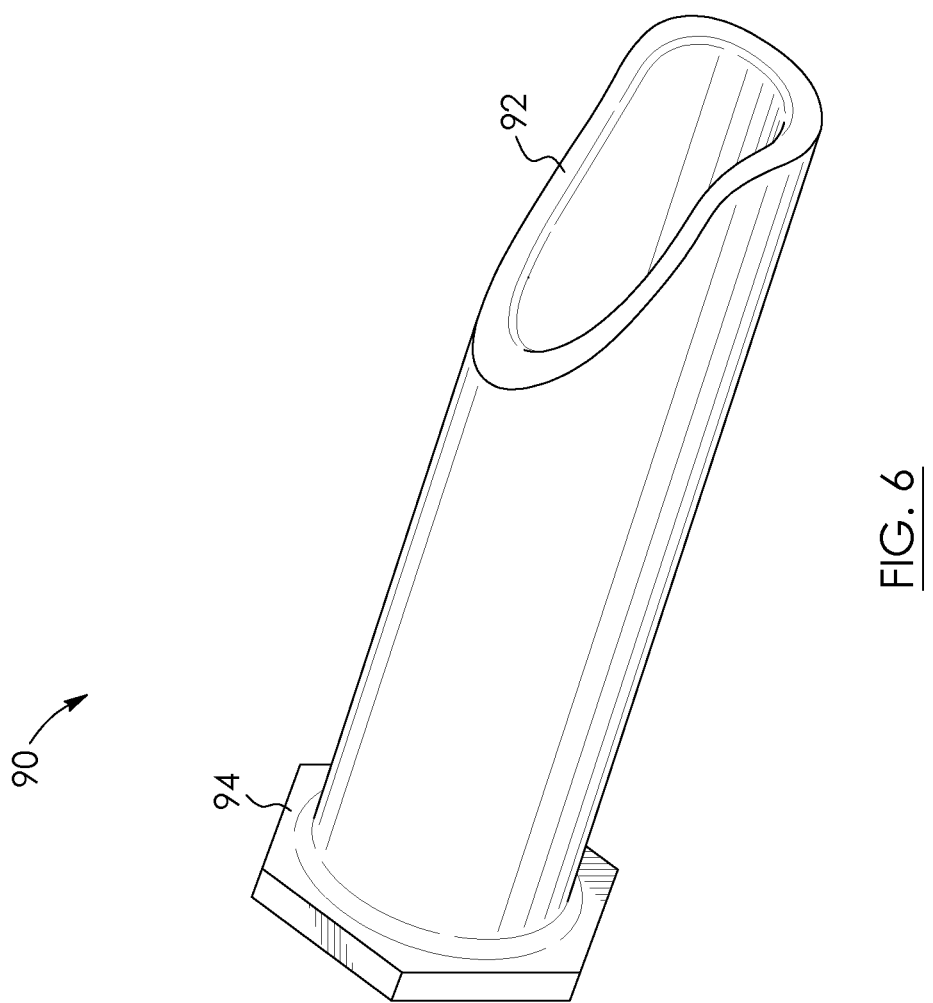
FIG. 6 is a perspective view of another embodiment of the steering cable core support sleeve.

The support sleeve 80, shown in greater detail in FIG. 5, has a notch 82 at first end thereof and lateral openings 84a and 84b. The notch 82 is formed in this example an oblique cut through the support sleeve 80. In this example there is also a longitudinal gap 86 extending the length of the support sleeve 80. FIG. 6 shows another embodiment of a support sleeve 90. The support sleeve 90 has a notch 92 at a first end thereof and a flange 94 at a second end thereof.

Figure 7:
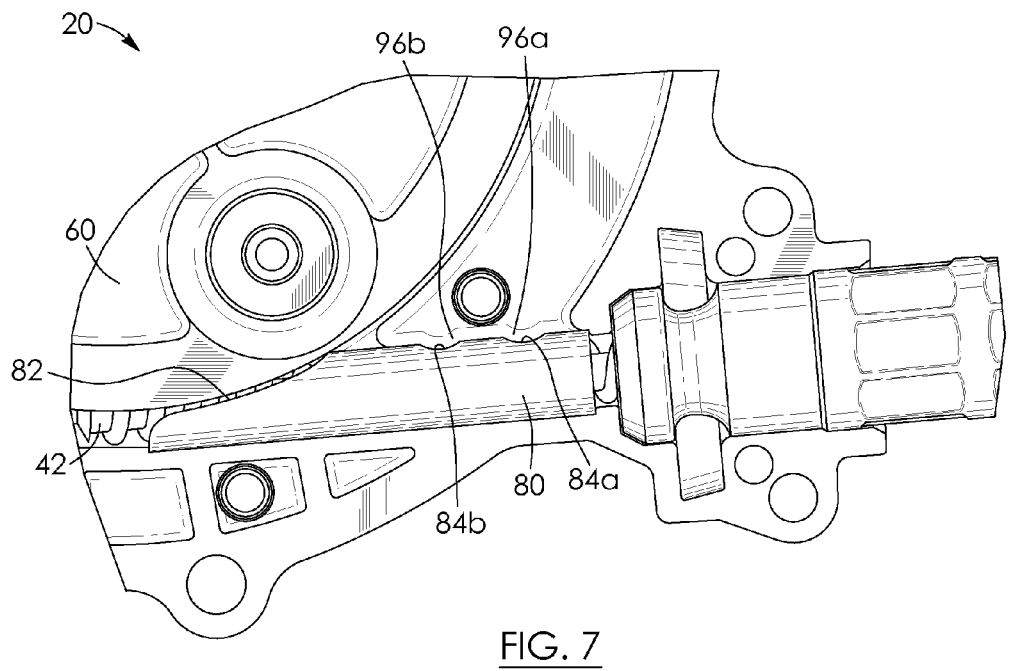
FIG. 7 is a top plan, fragmentary and broken-away, view of the mechanical steering actuator of FIG. 2.

Referring now to FIG. 7, the support sleeve 80 of FIG. 5 is shown in operative engagement with the cable core 42 and pulley wheel 60. The lateral openings 84a and 84b in the support sleeve 80 function as locating features for the support sleeve 80. Protrusions 96a and 96b engage corresponding ones of the lateral openings 84a and 84b in the support sleeve 80 to provide axial and rotational alignment of the support sleeve 80. Axial misalignment of the support sleeve 80 may cause excessive exposure of the cable core 42 outside the support sleeve 80 which may result in premature failure of the cable core 42. Rotational misalignment may result in the support sleeve 80 to interfere with the pulley wheel 60 or other internal components of the mechanical steering actuator. This may lead to poor helm feel or locked steering.

Figure 8:
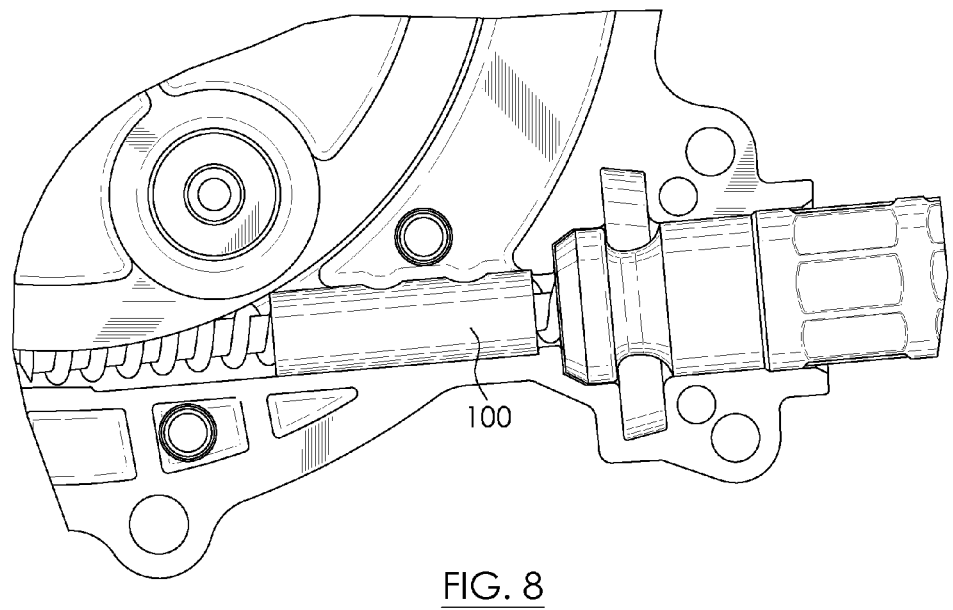
FIG. 8 is a top plan, fragmentary and broken-away, view of the mechanical steering actuator of FIG. 2 provided with yet another embodiment of the steering cable support.

The notch 82 in the support sleeve 80 allows the support sleeve 80 to cover or encapsulate as much as the cable core 42 as possible without pulley wheel 60 or other internal components of the mechanical steering actuator. However, this is not strictly required. FIG. 8 shows yet another embodiment of a support sleeve 100 which is substantially similar to the support sleeve 80 shown in FIGS. 5 and 7 with the notable exception that the support sleeve 100 of FIG. 8 does not have a notch at an end thereof.

It will be understood by a person skilled in the art that although the cable core support sleeve and steering actuator disclosed herein are used in a marine steering system that they may be used in system which uses an actuator and push/pull cable to transmit motion.

It will be understood by a person skilled in the art that many of the details provided above are by way of example only, and are not intended to limit the scope of the invention which is to be determined with reference to the following claims.

What is claimed is:

1. A steering actuator comprising:
   a housing having a steering cable entry port and a protrusion;
   a drive mechanism mounted within the housing, the drive mechanism including a drive shaft imparting rotary motion to a wheel;
   a steering cable having a cable core, the cable core of the steering cable extending through the steering cable entry port and being actuated by the wheel of the drive mechanism; and
   a steering cable core support sleeve disposed within the housing between the steering cable entry port and an interface between the cable core of the steering cable and the wheel of the drive mechanism, the steering cable core support sleeve having a notch at a first end thereof and a lateral opening, wherein the steering cable extends through the steering cable core support sleeve and the lateral opening of the steering cable support sleeve receives the protrusion in the housing to provide axial and rotational alignment of the steering cable support sleeve.

2. The steering actuator as claimed in claim 1 wherein the steering cable core support sleeve is constructed from a first material and the housing is constructed from a second material, the first material being harder than the second material.

3. The steering actuator as claimed in claim 1 wherein the notch at the first end of the steering cable core support sleeve exposes a portion of the cable core of the steering cable.

4. The steering actuator as claimed in claim 1 wherein the notch at the first end of the steering cable core support sleeve is an oblique cut.

5. The steering actuator as claimed in claim 1 wherein the steering cable core support sleeve has a flange at a second end thereof.

6. A marine vessel comprising a steering actuator, the steering actuator including:
   a housing having a steering cable entry port and a protrusion;
   a drive mechanism mounted within the housing, the drive mechanism including a drive shaft imparting rotary motion to a wheel;
   a steering cable having a cable core, the cable core of the steering cable extending through the steering cable entry port and being actuated by the wheel of the drive mechanism; and
   a steering cable core support sleeve disposed within the housing between the steering cable entry port and an interface between the cable core of the steering cable and the wheel of the drive mechanism, the steering cable core support sleeve having a notch at a first end thereof and a lateral opening, wherein the steering cable extends through the steering cable core support sleeve and the lateral opening of the steering cable support sleeve receives the protrusion in the housing to provide axial and rotational alignment of the steering cable support sleeve.

7. A steering actuator comprising:

a housing having a steering cable entry port;

a drive mechanism mounted within the housing, the drive mechanism including a drive shaft which imparts rotary motion to a wheel;

a steering cable having a cable core, the cable core of the steering cable extending through the steering cable entry port and being actuated by the wheel of the drive mechanism; and a steering cable core support sleeve disposed within the housing between the steering cable entry port and an interface between the cable core of the steering cable and the wheel of the drive mechanism, the steering cable core support sleeve having a notch at the interface between the cable core of the steering cable and the wheel of the drive mechanism to encapsulate the cable core of the steering cable at the interface between the cable core of the steering cable and the wheel of the drive mechanism, and to prevent the steering cable from buckling at the interface between the cable core of the steering cable and the wheel of the drive mechanism during the transmission of push/pull force.

8. The steering actuator as claimed in claim 7, wherein the steering cable core support sleeve is constructed from a first material and the housing is constructed from a second material, the first material being harder than the second material.

9. The steering actuator as claimed in claim 8, wherein the notch at the interface between the cable core of the steering cable and the wheel of the drive mechanism is an oblique cut.

* * * * *